(12) United States Patent
Hashimoto et al.

(10) Patent No.: US 6,335,764 B1
(45) Date of Patent: Jan. 1, 2002

(54) VIDEO OUTPUT APPARATUS

(75) Inventors: Tsutomu Hashimoto, Suita; Masaru Iwasa, Moriguchi; Eiko Fujii, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/257,044

(22) Filed: Feb. 25, 1999

(30) Foreign Application Priority Data

Apr. 9, 1998 (JP) .................................................. 10-097326

(51) Int. Cl.$^7$ ....................................................... H04N 5/45
(52) U.S. Cl. ............................................ 348/565; 348/569
(58) Field of Search ....................................... 348/563, 564, 348/565, 566, 567, 569, 584, 585, 588, 586, 589, 518, 501, 554, 555, 558; H04N 5/45

(56) References Cited

U.S. PATENT DOCUMENTS 5,534,942 A 7/1996 Beyers, Jr. et al. ........... 348/569

*Primary Examiner*—Michael Lee
(74) *Attorney, Agent, or Firm*—Wenderoth, Lind & Ponack, L.L.P.

(57) ABSTRACT

A video output apparatus comprises: video data processor for processing plural pieces of video data of different types and outputting the resulting video data to a monitor; video processing delay detector for detecting whether processing for the plural pieces of video data performed by the video data processor is completed in real time when it is output to the monitor; and video data processing controller for controlling the video data processor so that the processing performed by the video data processor which is allocated for on line period is reduced when the video processing delay detector detects delay in processing.

9 Claims, 17 Drawing Sheets

8bit/pixel

8bit/pixel

4bit/pixel

VIDEO OUTPUT APPARATUS

FIELD OF THE INVENTION

The present invention relates to a video output apparatus and, more particularly to a video output apparatus that is capable of performing real-time processing for a main picture including moving picture and still picture information, a sub-picture including subtitle information, and OSD (On Screen Display) data including menu and title image information with improved controllability, when these data are output.

BACKGROUND OF THE INVENTION

In recent years, with great advances in multimedia, there have been proposed various types of reproducing apparatus in the field of video in consideration of digital video broadcasting. In the future, it is thought that a larger volume of information should be sent from a broadcasting station. Then, it will be required for some reproducing apparatus to perform processing beyond its ability. When such processing beyond its specification is required, viewers might see degraded-quality video on the screen and might feel displeased with it. Conventionally, when a moving picture is displayed on a personal computer, it is possible to reproduce the same while diminishing the viewers' feeling of strangeness and in accordance with specifications of the reproducing apparatus, with the number of frames to-be-displayed per unit of time being reduced, i.e., with a frame chute being applied. However, in high vision broadcasting, which should provide high-quality video image, such processing as a frame chute would inevitably give the viewer displeasure.

It is also possible that the reproduction processing capabilities are realized by the use of a control device that has capabilities satisfying the processing, on the basis of the worst value in processing cycles required for the video output process. However, such construction of the video output apparatus results in a complicated construction of a control device. Besides, since the control device operates at a high frequency, this provides problems to environments.

In the prior art video output apparatus, in a case where a load is placed on the apparatus that is beyond its processing ability even when a load beyond its processing ability is required for the apparatus, no effective methods for processing data in real time have been proposed, without giving viewers displeasure with reproduced video.

In view of progress of multimedia that requires enormous amount of information to be transmitted, there have been demands for a video output apparatus, which is capable of handling enormous amount of information.

SUMMARY OF THE INVENTION

It is an object of the present invention to provide a video output apparatus which is capable of outputting video in a real-time video output process without displeasing viewers with it, even if the load placed on the apparatus exceeds its processing abilities.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, a video output apparatus comprises: video data processing means for processing plural pieces of video data of different types and outputting the resulting video data to a monitor; video processing delay detecting means for detecting delay by deciding whether processing for the plural pieces of video data performed by the video data processing means is completed in real time, when it is output to the monitor; and video data processing control means for controlling the video data processing means so that the processing performed by the video data processing means, which is to be allocated for one line period, is reduced when the video processing delay detecting means detects delay. Therefore, the real-time processing is guaranteed. In addition, viewers might not feel displeased with displayed video. Besides, there is little increase in a program size, and a control device required for processing need not have a complicated construction and operate at high frequencies.

According to a second embodiment of the present invention, in the video output apparatus of the first aspect, the video data processing control means controls the video data processing means by setting priority of the video data processing when the processing is reduced. Therefore, video data processing to be reduced can be selected among alternatives.

According to a third embodiment of the present invention, in the video output apparatus of the second aspect, the priority is determined according to distance from a user's view point to a display image on the monitor. Therefore, a user-oriented display can be realized.

According to a fourth aspect of the present invention, in the video output apparatus of the second aspect, the priority is determined according to display information set in the video data. Therefore, important information such as a program title is displayed with priority, and users will not miss it.

According to a fifth aspect of the present invention, in the video output apparatus of the first aspect, at least one of the processes for the plural pieces of video data to be performed during one line period is divided into plural processes. Therefore, capacities of buffer memories can be reduced.

According to a sixth aspect of the present invention, in the video output apparatus of the first aspect, the video processing delay detecting means detects delay in units each comprising either a predetermined number of fields or a predetermined number of frames. Therefore, a load placed on hardware caused by detecting delay can be reduced.

According to a seventh aspect of the present invention, in the video output apparatus of the first aspect, the video processing delay detecting means detects delay in units each comprising a predetermined number of lines. Therefore, a highly precise image can be displayed.

According to an eighth aspect of the present invention, in the video output apparatus of the first or fifth aspect, the video data processing control means skips at least one part of video data processing among the processing for the plural pieces of video data, to reduce the processing. Therefore, the quality of the displayed image is not degraded, and desired video data can be referred to.

DETAILED DESCRIPTION OF THE PREFERRED EMBODIMENTS

Now, a description will be given of preferred embodiments of the present invention with reference to figures.

Embodiment 1

Figure 1:
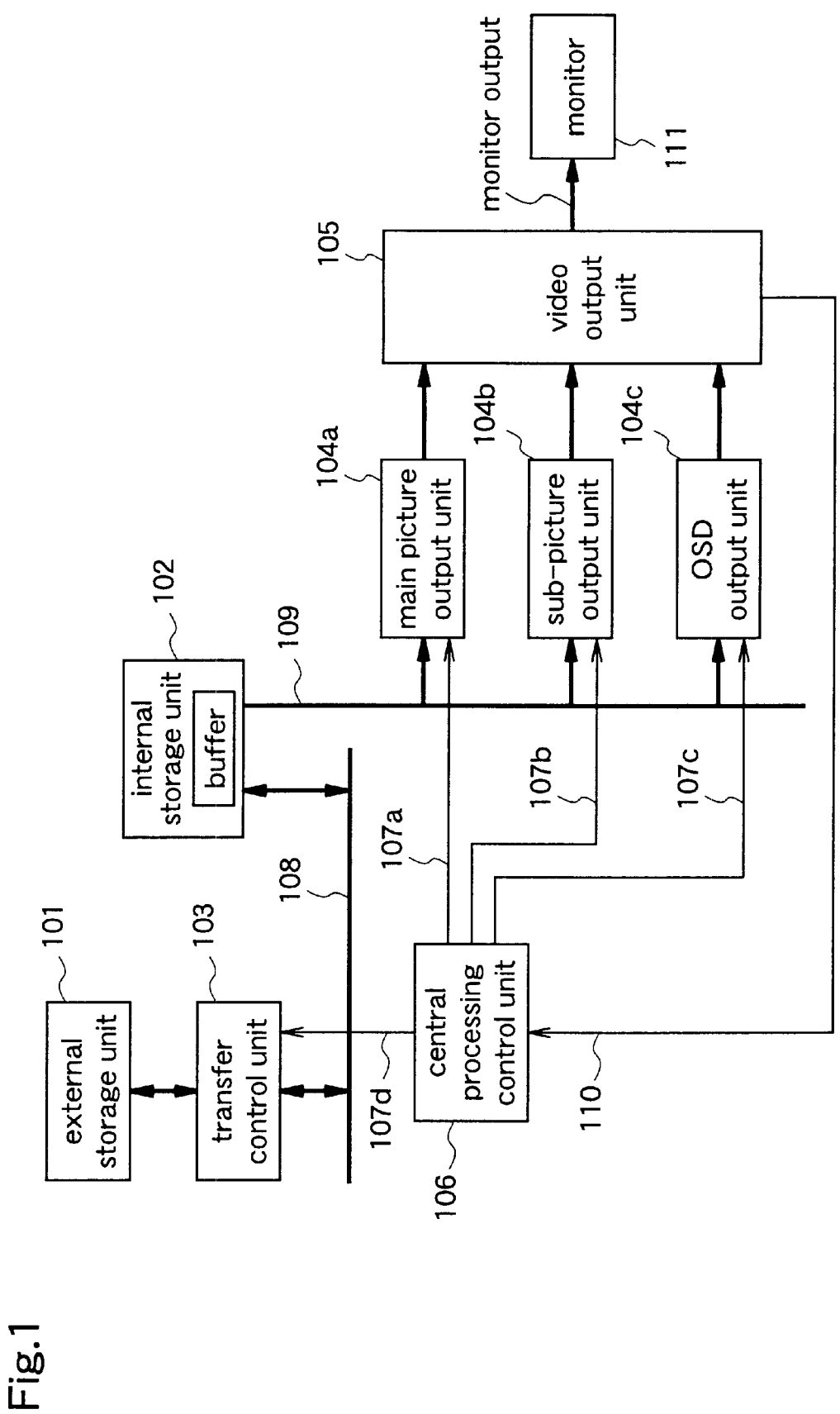
FIG. 1 is a diagram showing a video output apparatus according to a first embodiment of the present invention.

FIG. 1 shows a video output apparatus according to a first embodiment of the present invention. Turning now to FIG. 1: reference numeral 101 designates an external storage unit for storing main picture data, sub-picture data, and OSD data, which are to be output and displayed; 102 designates an internal storage unit for buffering the main picture data, the sub-picture data, and the OSD data stored in the external storage unit 101, which are to be sequentially fetched therefrom; 103 designates a transfer control unit for controlling data transfer between the external storage unit 101 and the internal storage unit 102; 108 designates a first internal bus for interconnecting the transfer control unit 103 and the internal storage unit 102; 104a designates a main picture output unit, which receives the main picture data from the internal storage unit 102 and outputs the main picture data; 104b designates a sub-picture output unit, which receives the sub-picture data from the internal storage unit 102 and outputs the sub-picture data; and 104c designates an OSD output unit which receives the OSD data from the internal storage unit 102 and outputs the OSD data.

Reference numeral 109 designates a second internal bus for interconnecting the internal storage unit 102 and the main picture output unit 104a, the sub-picture output unit 104b, and the OSD output unit 104c.

Reference numeral 105 designates a video output unit, which receives data from the main picture output unit 104a, the sub-picture output unit 104b, and the OSD output unit 104c as inputs, mixes these data, and outputs the resulting mixed data to a monitor 111. Reference numeral 106 designates a central processing control unit, which receives a control signal 110 from the video output unit 105 and controls the main picture output unit 104a, the sub-picture output unit 104b, the OSD output unit 104c, and the transfer control unit 103 by executing an internal program. The output operations of these units 104a, 104b, 104c and 103 are controlled by control signals 107a, 107b, 107c, and 107d, respectively. The role of the control signal 110 is to inform the central processing unit 106 of a starting time of one line in the video output.

Figure 2:
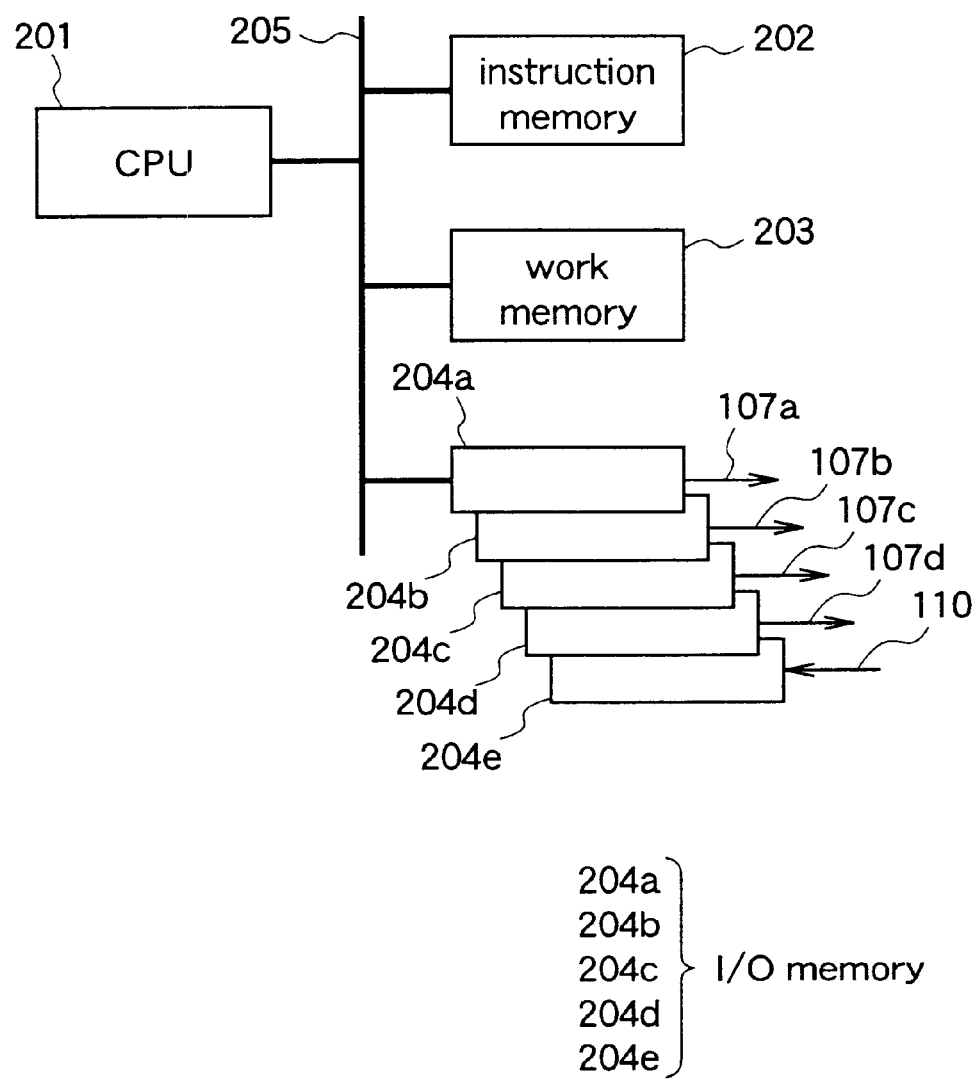
FIG. 2 is a diagram showing a central processing unit included in the video output apparatus of the first embodiment.

FIG. 2 shows a detailed structure of the central processing control unit 106. The control unit 106 comprises a central processing unit (CPU)201, an instruction memory 202, a work memory 203, I/O memories 204a–204e, and an internal bus 205.

The instruction memory 202 stores instructions (program) executed by the CPU 201. The CPU 201 is adapted to execute the program stored in the instruction memory 202. The work memory 203 stores processed data in the middle of processing by the CPU 201. The I/O memory 204a is a control memory for the main picture output unit 104a and is called a "memory mapped I/O" memory. Likewise, the I/O memories 204b, 204c, and 204d are memories for controlling the sub-picture output unit 104b, the OSD output unit 104c, and the tranfer control unit 103, respectively. The CPU 201 is connected to the instruction memory 202, the work memory 203, and the I/O memories 204a–204e by means of the internal bus 205.

The I/O memory 204e is a memory to which the control signal from the video output unit 105 is input. The starting time of one line is detected when the CPU 201 reads information of the control signal 110, which has been written into the I/O memory 204e.

Here it is assumed that a subsequent line starts when the I/O memory 204e's value is "0". When the CPU 201 writes "1" at the starting point of a line, and the I/O memory 204e's value is "0" in a decision process, it is decided that the subsequent line has started. On the other hand, when the value is "1", it is decided that the subsequent line has not started.

Subsequently, a description will be given of a video output process performed by the central processing control unit 106 shown in FIG. 2 with reference to flowchart in FIG. 3. In the process, if the whole video output process cannot be performed in real time, sub-picture processing is skipped (bypassed) and the sub-picture will not be output and displayed, thereby realizing the output process in real time. The video output process is performed field by field or frame by frame.

In the main picture processing, the sub-picture processing and the OSD processing, processing intervals differ from one other depending upon capacities of buffer memories. These buffer memories are used for buffering respective video data. For instance, when the capacities allocated for the main picture is larger than display field image data, the main picture output process is performed once per field. Likewise, if the sub-picture output process and the OSD output process are respectively performed once per field, then main picture output process can be performed during plural display line period, the sub-picture output process can be performed during another plural display line period, and the OSD output process can be performed during still another plural display line period.

However, increases in capacities of memories in the internal storage unit 102 causes a large-scale circuit. To reduce the scale of the circuit, the capacities of these buffer memories must be correspondingly reduced. This shortens processing intervals of the main picture output process, the sub-picture output process, and the OSD output process. In this first embodiment, any of the main picture output process, the sub-picture output process, and the OSD output process are performed twice per one line period. Hereinafter, processing allocated for one line period refers to respective video output processes to be performed during one display line period.

In processes 301a and 301b, main picture processing A and main picture processing B are performed, respectively. In processes 303a and 303b, OSD processing A and OSD processing B are performed, respectively. Thus, these processing are each divided into two processings. In these processes, data transfer from the external storage unit 101 to the internal storage unit 102, the main picture output unit 104a, the sub-picture output unit 104b, or the OSD output unit 104c is controlled.

In processes 304a and 304b, it is decided whether processing is delayed. According to results of these decision processes, the sub-picture processing A and B in processes 302a and 302b are skipped (bypassed). When the processes 302a and 302b are skipped, the amount of data to be processed is reduced.

In a process 305, it is decided whether one line processing for the output of the monitor 111 is completed. When decided in the process 305 that the one line processing is not completed (delayed), in a process 306, "1" is assigned to the value of a flag used in the decision processes 304a and 304b.

In a process 307, it is decided whether the number of lines in a field or a frame is exceeded. When decided that the number of lines is not exceeded, processing is returned to the process 301a, and processes 301a through 306 are repeated.

In a process 308, initialization is performed by assigning "0" to the value of the flag. FIG. 4 shows a case where delay has occurred in the processing in FIG. 3.

Assume that the main picture processing, the sub-picture processing, and the OSD processing area each completed within one line. In FIG. 4, reference numeral 400 designates and H-SYNC (horizontal synchronizing) signal. 400a designates the starting point of one line processing and 400b designates the starting point of a subsequent-line processing. 401 designates a line of video output, 402 designates a line which follows the line 401, and 403 designates a line which follows the line 402. Assuming that these lines 401, 402, and 403 are lines A, B and C, respectively, the starting point 400b of the subsequent line on the line A 401 is identical to the starting point 400a of the line B 402. Likewise, the starting point 400b of the subsequent line on the line B 402 is identical to the starting point 400a of the line C 403.

Processing 410 is processing to be performed on the line A 401 and comprises main picture processing A 411a, main picture processing B 411b, sub-picture processing a 412a, sub-picture processing B 412b, OSD processing A 413a, and OSD processing B 413b. 410x designates a point at which the decision process 305 is performed to decide whether or not delay has occurred in the processing on the line A 401.

Processing 420 is processing to be performed on the line B 402 and comprises main picture processing A 421a, main picture processing B 412b, OSD processing A 423a, and OSD processing B 423b.

Likewise, processing 430 is processing to be performed on the line C 403 and comprises main picture processing A 431a, main picture processing B 431b, OSD processing A 433a, and OSD processing B 433b. In the video output process 410, the main picture processing A 411a, the sub-picture processing A 412a, the OSD processing A 413a, the main picture processing B 411b, the sub-picture processing B 412b, the OSD processing B 413b, and the decision process 305 at the point 410x are performed in this order.

In the video output process 240, the main picture processing A 421a, the OSD processing A 423a, the main picture processing B 421b, and the OSD processing B 423b are performed in this order. In the video output process 430, the main picture processing A 413a, the OSD processing A 433a, the main picture processing B 431b, and the OSD processing B 433b are performed in this order.

Reference numeral 403a represents room for processing on the line C 403.

Figure 3:
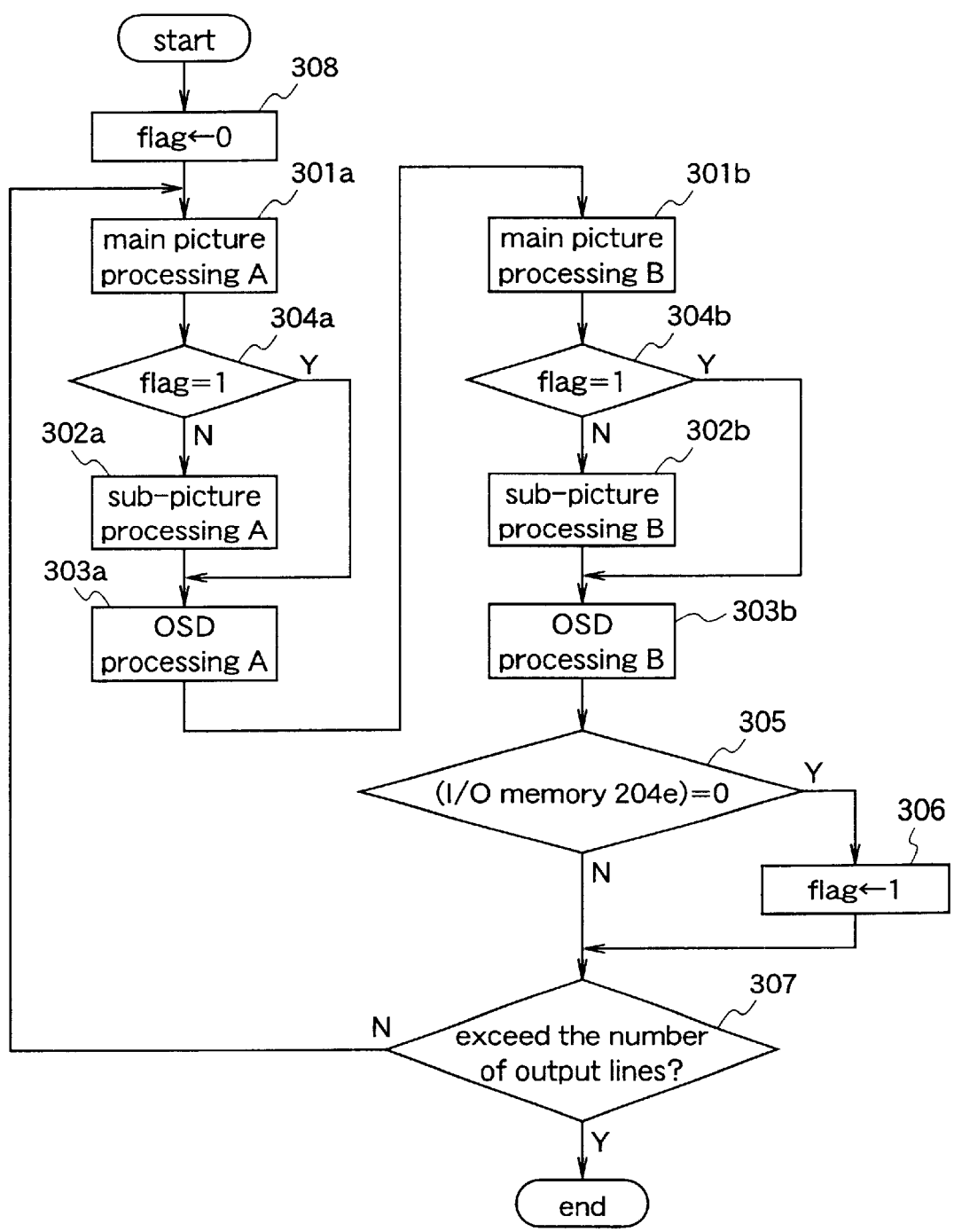
FIG. 3 is a flow chart showing processing performed by the video output apparatus of the first embodiment.
Figure 4:
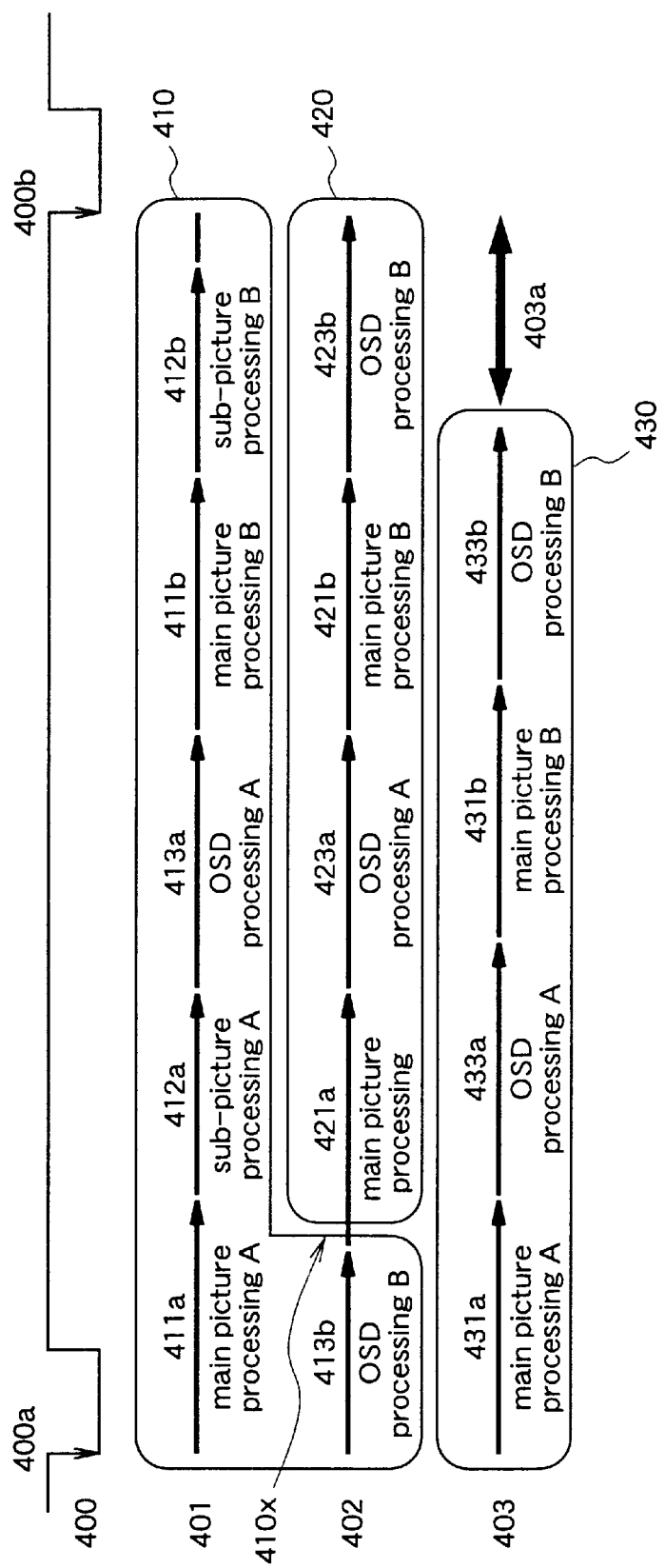
FIG. 4 is a diagram showing a case where there is a delay in a video output process performed by the video output apparatus of the first embodiment.

In these video output processes 410, 420, and 430, decision processes 304a, 304b, 305, and 307, and assignment processes 306 and 308 shown in FIG. 3 are omitted for the sake of simplicity.

Hereinafter, a description will be given of a case where the load of the video output process 410 on the line A 401 on the central processing control unit 106 exceeds its processing capability and thereby exceeds the starting point 400a of the line B 402. This means that all of the video output processes are not completed within one line. In this case, the decision process 305 is performed at the point 410x which exceeds the start point of the subsequent line.

The result of the decision process 305 is "Y", and then in the assignment process 306, "1" is assigned to the value of the flag. In the video output process 420 on the following line B 402, the results of the decision processes 304a and 304b are respectively "Y", and therefore, the sub-picture processing A 302a and the sub-picture processing B 302b are not performed. In other words, as shown in FIG. 4, in the video output process 420, the main picture processing A 421a, the OSD processing A 423a, the main picture processing B 421b, and the OSD processing B 423b are performed in this order.

Thus, the video output process 420 is contained entirely on the line B 402. Further, in the video output process 430 on the line C 403, like the video output process 420, the main picture processing A 431a, the OSD processing A 433a, the main picture processing B 431b, and the OSD processing B 433b are performed in this order.

As a result, the room 403a occurs in the video output process 430. On the following line, there is also a room for processing, and thereby the real-time video output process is realized.

In this first embodiment, each of the main picture output process, the sub-picture output process, and the OSD output process is divided into two (A and B)processes. Thereby, at least one of the two processes can be performed. Thereby, each of the output processes can be reflected on the other processes.

Thus, in accordance with the first embodiment, the decision process 305, the assignment process 306, and the decision processes 304a and 304b are provided, wherein, when it is detected that all of the main picture, the sub-picture, and the OSD data cannot be output in real time, the sub-picture processing 302a and 302b are not performed on the subsequent line. Thereby, the amount of data to-be-processed in the whole output process can be reduced and thereby the real-time video output process is guaranteed.

In addition, these decision processes and assignment processes are small in program size. Besides, the control device for controlling these processes need not be made complicated in construction and operate at high frequencies.

While in the first embodiment, the main picture processing, the sub-picture processing, and the OSD processing are performed in this order in the video output process, the order of the output processes is not limited to this, and the same effects can be provided in a different order.

While in the first embodiment, each of the main picture output process, the sub-picture output process, and the OSD output process is divided into two processes, and the decision processes 304a and 304b shown in FIG. 3 are both performed to decide that the sub-picture processing A 302a and the sub-picture processing B 302b will not be performed, thereby reducing the processing, it is possible that one of the decision processes 304a and 304b is not performed to perform at least either of the sub-picture processing A 302a and the sub-picture processing B 302b. This allows processing to-be-skipped to set in a stepwise fashion.

While in the first embodiment, each of the main picture output process, the sub-picture output process, and the OSD output process is divided into two processes, it may be divided into three processes or more. This allows processing to-be-skipped to be selected among many alternatives and thereby allows more processing to be completed within one line.

While in the first embodiment, both of the two sub-picture processing are skipped, one of these processing may be skipped. Even if one of the decision processes 302 is dispensed with, the same effects can be provided.

While in the first embodiment, the sub-picture processing is skipped, either the main picture processing or the OSD processing may be skipped.

In this case, either of the two main picture processing may be skipped or either of the two OSD processing may be skipped.

In the first embodiment, the flag for use in the decision processes is initialized field by field or frame by frame. In this case, the assignment process 308 which initializes the flag is for each field or for each frame. When some delay has occurred in the process, processing is reduced field to field or frame to frame to lessen lost information. The flag may be initialized for each plural fields or for each plural frames to simplify processing, although this somewhat increases lost information.

Figure 18:
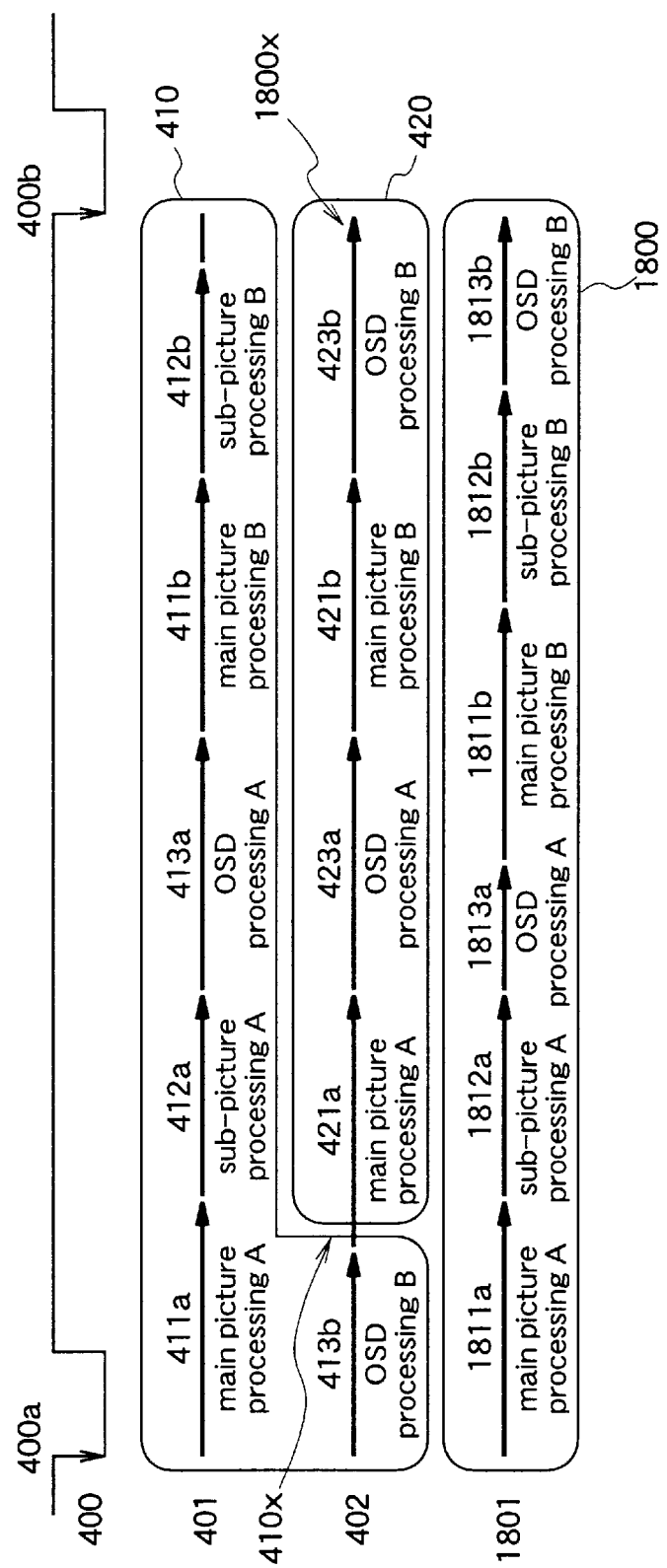
FIG. 18 shows a case where a delay occurs in processing in a process for deciding whether delay occurs in processing for each line.

For a case where the flag is initialized for each line, the assignment process 308 is performed for each line to perform the decision process for each line. FIG. 18 shows an example in which some processing delay has occurred in the case where the decision process is performed for each line. In FIG. 18, 1801 designates a line D on which a video output process is performed. 1800 designates processing allocated for the line D, and comprises main picture processing A 1811a, main picture processing B 1811b, sub-picture processing A 1812a, sub-picture processing B 1812b, OSD processing A 1813a, and OSD processing B 1813b. Compared with the lines A 401 and B 402, on the line D 1801, the number of pixels in the corresponding OSD image to be displayed is fewer than therefore the OSD processing A 1813a and the OSD processing B 1813b are performed in shorter cycles.

The OSD image can be displayed with arbitrary display width and display height in an arbitrary position of a screen. The display contents differ from each other between the lines B and D. 1800x designates a point at display time of the line B 402 at which the decision process 305 is performed, which follows the video output process on the line B 402 comprising the main picture processing A 421a, the OSD processing A 423a, the main picture processing B 421b, and the OSD processing B 423b. Herein, decision processes 304a, 304b, 305, and 307, and assignment processes 306 and 308 shown in FIG. 3 are omitted for the sake of simplicity. The same reference numerals shown in FIG. 4 designate the same or the corresponding parts.

As already described, when some delay has occurred in processing on the line A 401, the sub-picture processing A 412a and the sub-picture processing B 412b are not performed on the line B 402 and the line C 403, to reduce processing allocated for one line. In the following decision step at point 1800x, the result of the decision process 305 is "N", because processing to be allocated for one line is contained on one line. Therefore, the results, of the decision processes 304a and 304b on the following line D 1801 are both "N". This is because the process 308 is performed for each line unlike the assignment process 308 shown in FIG. 3. For this reason, on the line D 1801, the main picture processing, the sub-picture processing, and the OSD processing can be performed.

To be more detailed, the flag for use in the decision process 305 is initialized for each line by assigning "0" to the value of the flag in the assignment process 308. Thereby, the sub-picture processing is skipped during one line period.

Since only the sub-picture processing on the line 402 is not displayed, the resulting video is not significantly different from video in which main picture, sub-picture and OSD video are all displayed.

Since the decision process is thus performed for each line, and reduction of processing is adjusted for each line, respective video outputs can be displayed as much as possible for further improvement.

Although the sub-picture processing is skipped to reduce the video output process, the main picture processing and the OSD processing may be skipped in a like manner.

Embodiment 2

A description will be given of a video output apparatus according to a second embodiment of the present invention with reference to figures. The construction of the video output apparatus of the second embodiment is almost identical to that of the first embodiment and differs from that in flow of video output process.

Figure 5:
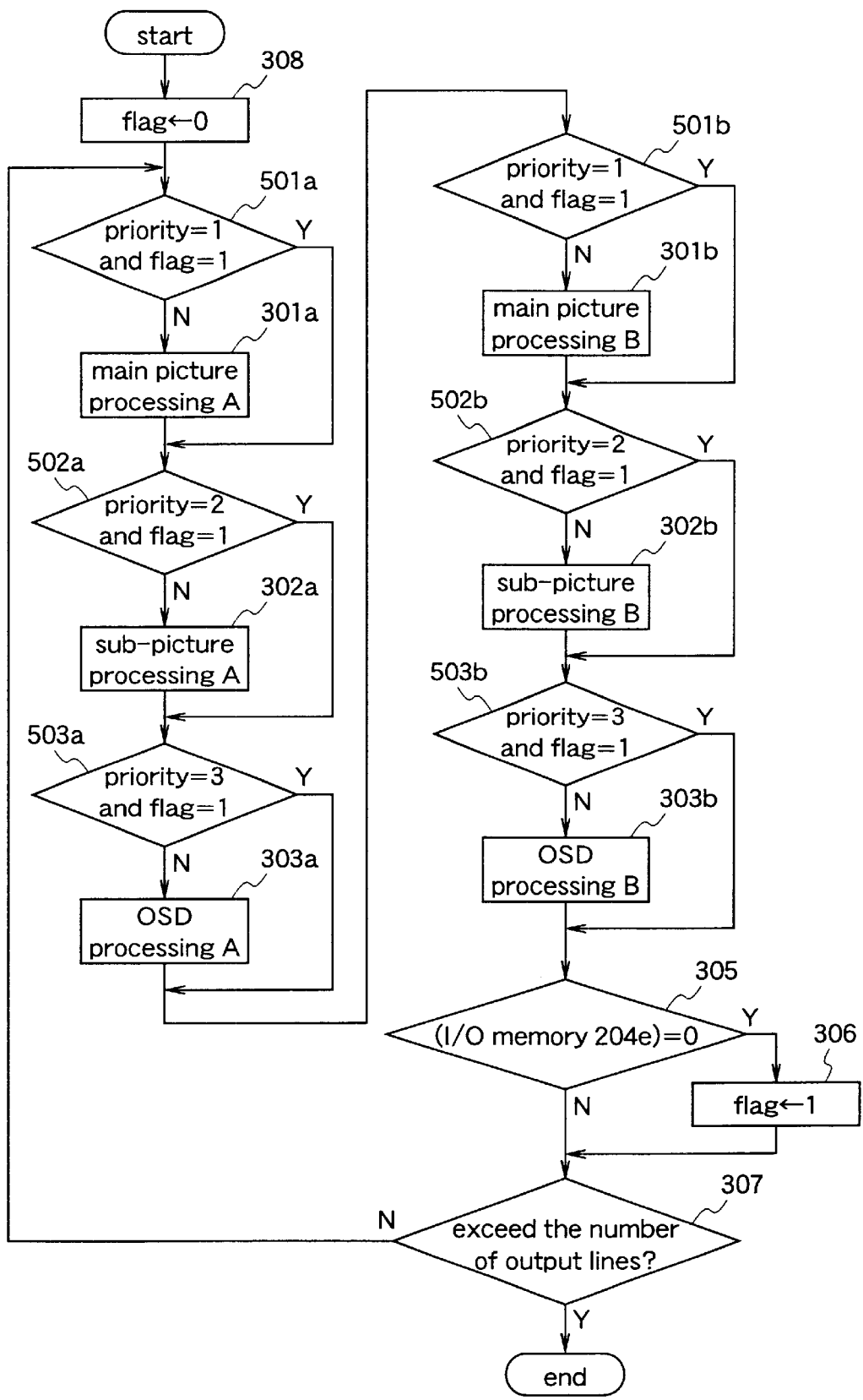
FIG. 5 is a flow chart showing processing performed by a video output apparatus according to a second embodiment of the present invention.

FIG. 5 shows flow of processing performed by the video output apparatus of the second embodiment. As shown in FIG. 5, in the video output process of the second embodiment, decision processes 501a, 501b, 502a, 502b, 503a, and 503b have replaced the decision processes 304a and 304b of the first embodiment, and the other processes are identical to those of the first embodiment.

The decision processes 501a, 501b, 502a, 502b, 503a, and 503b, decide whether processing is delayed, and are performed according to a set skip (bypass) priority. A flag indicating this priority is "priority". According to the results of the decision processes 501a and 501b, the main picture processing A 301a and the main picture processing B 301b are skipped (bypassed). Also, according to the results of the decision processes 502a and 502b, the sub-picture processing A 302a and the sub-picture processing B 302b are skipped. Likewise, according to the results of the decision processes 503a and 503b, the OSD processing A 303a and the OSD processing B 303b are skipped.

When the priority is predetermined and the priority of the main picture processing is the lowest, the "priority" is set to "1". Thereby, when the central processing control unit 106 cannot handle all of the video output processes, that is, processing in the control unit 106 is delayed, the main picture processing A 301a and the main picture processing B 301b are skipped.

When the priority of the sub-picture processing is the lowest, the "priority" is set to "2". Thereby, if the processing in the control unit 106 is delayed, the sub-picture processing A 302a and the sub-picture processing B 302b are skipped.

When the priority of the OSD processing is the lowest, the "priority" is set to "3". Thereby, if processing in the control unit 106 is delayed, the OSD processing A 303a and the OSD processing B 303b are skipped. In brief, when all of the video output processes cannot be carried out in real time, the amount of data to be processed in the video output processes can be reduced and thereby the real-time video output process can be realized. The priority can be set dynamically according to display priority in the system.

Figure 6:
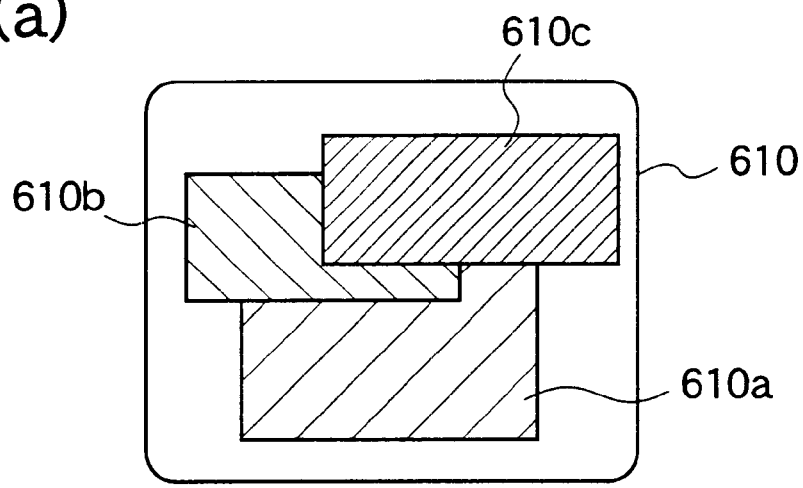
FIGS. 6(a)–6(c) are diagrams for explaining display images resulting from a process for outputting video performed by the video output apparatus of the second embodiment.
Figure 6:
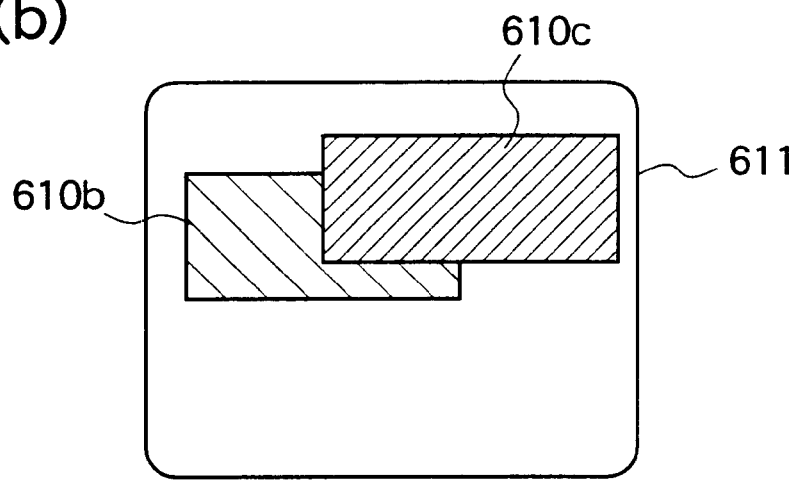
Figure 6:
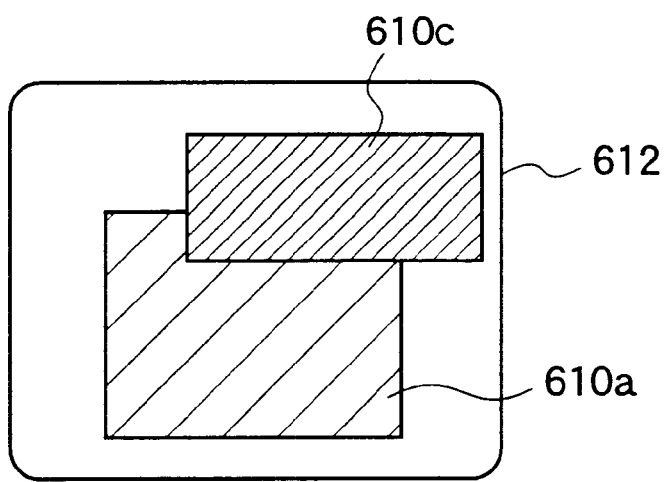

A description will be given of a method for setting this priority according to the order in which video is displayed. FIGS. 6(a)–6(c) show display images as a result of processing performed by the video output apparatus of the second embodiment. In FIG. 6(a), 610 designates a display image before the process is reduced. In FIGS. 6(b) and 6(c), 611 and 612 designate display images after the process is reduced, respectively, for the case where processing in the control unit 106 is delayed because the worst condition has occurred in processing cycles or some of output processes are placed in wait state and thereby all of the video output processes cannot be performed in real time.

In these FIGS. 610a, 610b, and 610c designate displayed main picture, displayed sub-picture, and displayed OSD data, respectively. Seen from the user's view point, the displayed OSD data 610c, the displayed sub-picture 610b, and the displayed main picture 610a are placed in this order.

According to this order, assume that the main picture processing is not performed, and the priority is set to "1". This is because it is decided that the video displayed in the deepest position seen from the user's view point is not always significant. When all of the video output processes cannot be carried out in real time, the main picture processing A 301a and the main picture processing B 301b for the video 610a are skipped to reduce the video output processes. As a result, as shown in FIGS. 6(a) and 6(b), the display image 610 is changed into the display image 611.

In some cases, it is decided that the video displayed in the middle from the user's view point is less significant. In such cases, the "priority" is set to "2", and thereby the sub-picture processing A 302a and the sub-picture processing B 302 B for the sub-picture 610b are skipped when all of the output processes cannot be carried out in real time. As a result, as shown in FIGS. 6(a) and 6(c), the display image 610 is changed into the display image 612.

Setting the "priority" according to the view point dynamically changes the output process to be skipped when delay occurs in the video output process. In other words, every time an image is displayed, the most significant video information can be displayed at least.

Thus, in accordance with the second embodiment, the decision processes 501a, 501b, 502a and 502b are provided, wherein, when it is decided that the all of the main picture, the sub-picture, and the OSD data cannot be output in real time, the main picture processing 301a and 301b, the sub-picture processing 302a and 302b, or the OSD processing 303a and 303b are skipped (bypassed). Thereby, like the first embodiment, the real-time output process is guaranteed and there is no increase in the program size and complexity in device construction, and no need for high-frequency operation. Moreover, the priority is set in such a manner that processing of video information which has the least effects if it is not displayed is skipped, which realizes user-oriented control.

While in the second embodiment, the priority of the main picture processing, the sub-picture processing, and the OSD processing is set from the user's view point, this may be performed according to the priority specified by the user. The user can set the priority as he/she likes, that is, according to his/her interest. This realizes user-oriented control in contrast with the first embodiment where video information to be displayed is automatically deleted.

While in the second embodiment, the priority is set according to the user's view point, the priority may be set according to present display state. In a case where the OSD used for setting the menu screen which controls the apparatus is displayed, the OSD data is displayed with higher priority. In another case where the sub-picture should be displayed with priority, this is performed according to a command for forcibly displaying the sub-picture such as a command FSTA_DSP included in SP_DCSQ according to a DVD standard (DVD Specification for Read-Only Disc, Parts VIDEO SPECIFICATIONS Version 1.0 August 1996).

Embodiment 3

A description will be given of a video output apparatus according to a third embodiment of the present invention with reference to the figures. The construction of the video output apparatus of the third embodiment is almost identical to that of the first embodiment and differs from that in the flow of video output process, particularly in the OSD output process.

Figure 7:
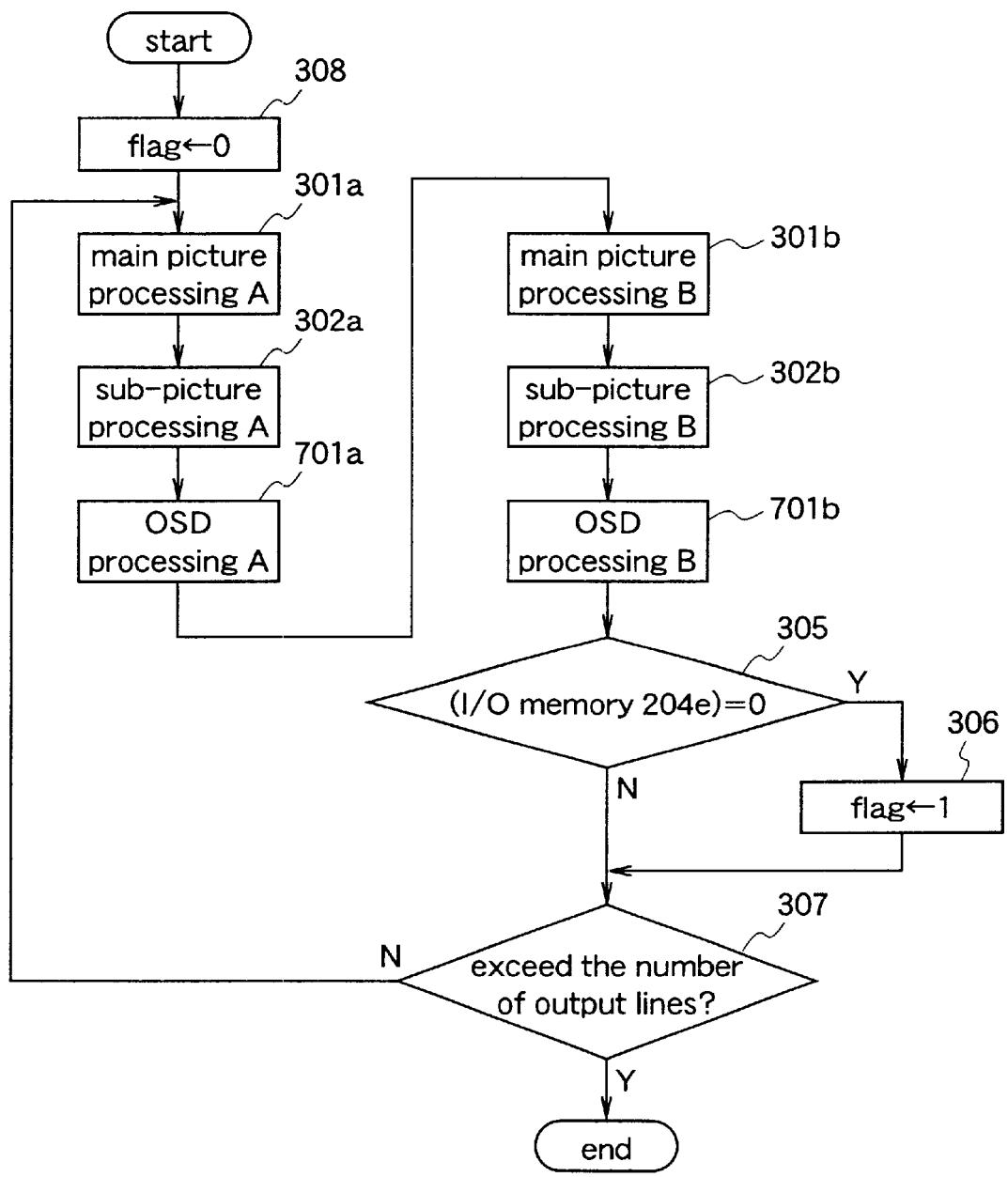
FIG. 7 is a flow chart showing processing performed by a video output apparatus according to a third embodiment of the present invention.

FIG. 7 shows a flowchart of processing performed by the video output apparatus. In the video output process of the third embodiment, the decision processes 304a and 304b of the first embodiment are not provided and the OSD processing A 303a and B 303b of the first embodiment have been replaced by OSD processing A 701a and B 701b. In this third embodiment, when all of the video output processes cannot be carried out in real time, the OSD processing is not performed, and the other processing are identical to those of the first embodiment.

Figure 8:
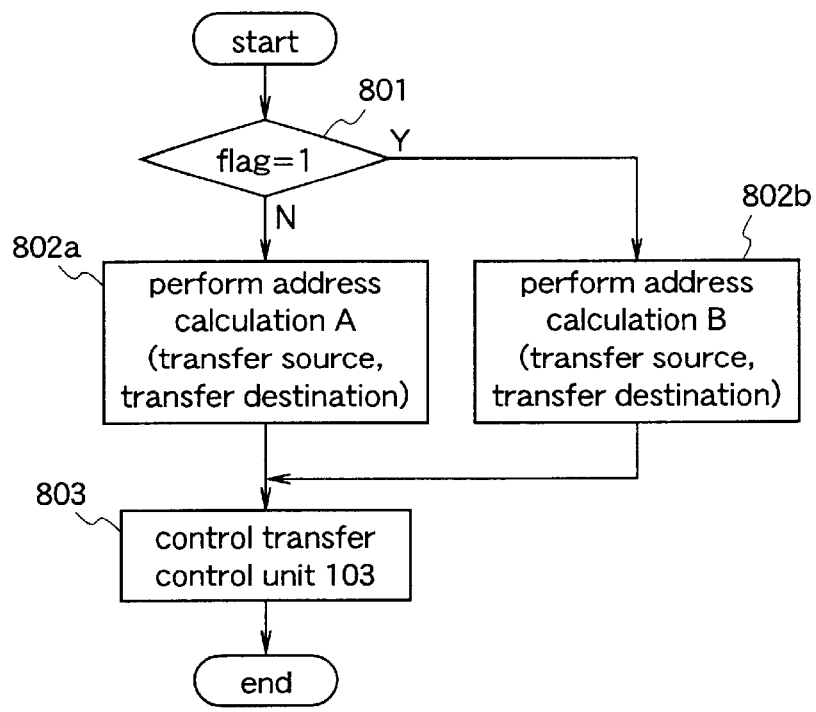
FIG. 8 is a flow chart showing OSD processing A performed by the video output apparatus of the third embodiment.
Figure 9:
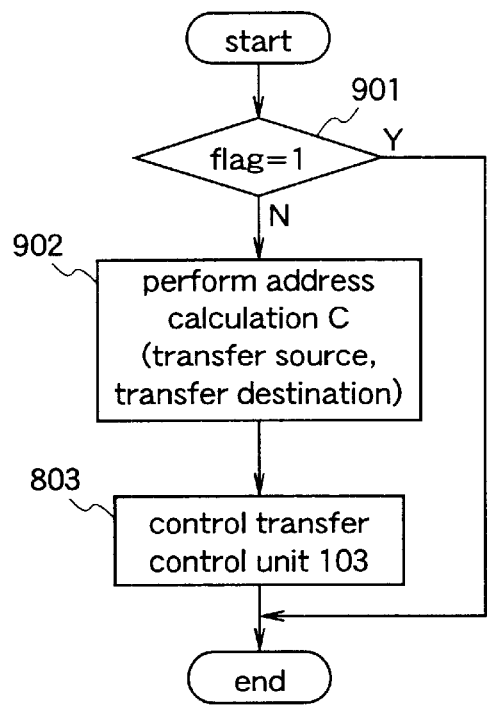
FIG. 9 is a flow chart showing flow of OSD processing B performed by the video output apparatus of the third embodiment.

FIG. 8 shows flow of the OSD processing A 701a and FIG. 9 shows flow of the OSD processing B 701b.

The OSD processing A 701a in FIG. 8 comprises a decision process 801, an address calculation process A 802a, an address calculation process B 802b, and a transfer control process 803 for the transfer control unit 103.

The address calculation process A 802a and the address calculation process B 802b respectively calculate an address of an OSD image in the external storage unit 101 as a transfer source and an address of the OSD image in the internal storage unit 102 as a transfer destination. If all of the video output processes can be carried out in real time, the address calculation process A 802*a* is performed, or otherwise, the address calculation process B 802*b* is performed. The difference between these calculation processes will be discussed later. In a process 801, it is decided whether all of the output processes can be carried out in real time. If decided "possible", control is given to the address calculation process A 802*a*, or otherwise, control is given to the address calculation process B 802*b*. Then, in the transfer control process 803, data transfer between the external storage unit 101 and the internal storage unit 102 is started.

The OSD processing B 701*b*, as shown in FIG. 9, comprises a decision process 901, an address calculation process C 902, and a transfer control process 803 for the transfer control unit 103.

The address calculation process C 902 calculates an address of an OSD image in the external storage unit 101 as the transfer source and an address of the OSD image in the internal storage unit 102 as the transfer destination.

In a process 901, it is decided whether all of the output processes can be carried out in real time. If decided "possible", the address calculation process C 902 and the control process 803 are performed. Otherwise, the address calculation process C 902 and the control process 803 are skipped.

When all of the output processes can be carried out in real time, in the OSD output process, the address calculation process A 802*a* and the transfer control process 803, and the address calculation process C 902 and the transfer control process 803 are performed. Conversely, when all of the output processes cannot be performed in real time, as in the case of the decision processes of the first and second embodiment, in the OSD output process, the address calculation process B 802*b* and the following transfer control process 803 are performed.

A description will be given of a case where 8 bit/pixel OSD data (OSD data comprising pixels each made of 8 bits) whose 720 pixels are output in the horizontal direction.

In this case, 720-byte OSD image data is transferred (1 byte=8 bits). When all of the video output processes can be performed and therefore the address calculation processes 802*a* and 902 are performed, assume that the 360-byte OSD data is transferred at a time. This is performed to reduce a capacity of the internal storage unit 102 or reduce waiting time of access to the external storage unit 101. When all of the output processes are not completed within one line, and thereby they cannot be performed in real time, in the OSD output process, the OSD processing B 701*b* is substantially skipped to reduce the processes. As a result, only the OSD processing A 701*a* is performed. A problem with this case is that 360 pixels in the 8 bit/pixel OSD data are output in the horizontal direction. Hence, if 4 bit/pixel OSD data (720 pixel in the horizontal direction) is output, then 360-byte data can be transferred at a time. In other words, all that has to be done to realize the OSD video output process is to perform the OSD processing A 701*a*.

Figure 10:
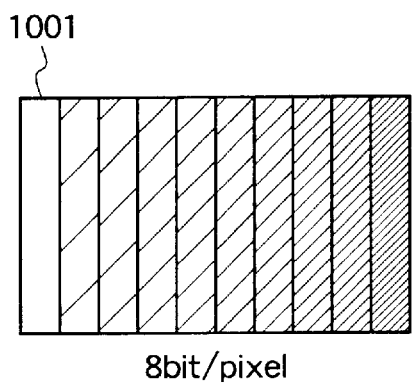
FIGS. 10(a)–10(c) are diagram showing OSD output images in an OSD processing performed by the video output apparatus of the third embodiment.
Figure 10:
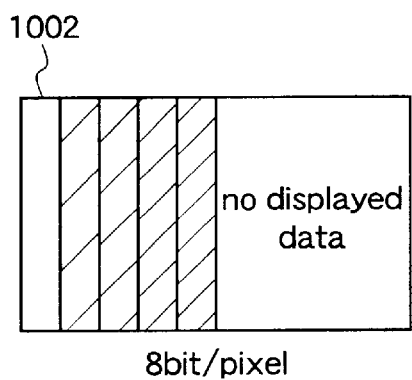
Figure 10:
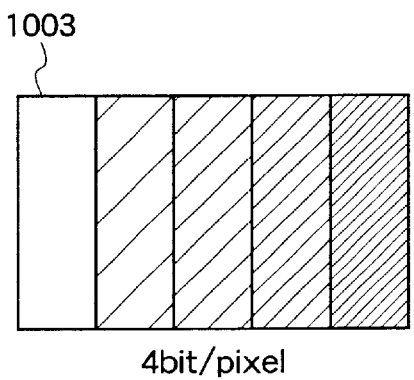

FIGS. 10(*a*)–10(*c*) show an example of this. Shown in FIG. 10(*a*) is an OSD image 1001 in a case where the real-time video output process is possible. Shown in FIG. 10(*b*) is an 8 bit/pixel OSD image 1002 in a case where the real-time video output process is impossible. Shown in FIG. 10(*c*) is a 4 bit/pixel OSD image 1003 in a case where the real-time video output process is impossible. In these images, the image 1003 in FIG. 10(*c*) represents the OSD image according to the third embodiment. If comparison is made for the images 1002 and 1003 in which amount of processed OSD data has been reduced, the image 1003 corresponding to the full OSD image has great display effects, in contrast with the image 1002 in which the half of the OSD image is not completely output. Although the amount of information relating to color number in the image 1003 is reduced, information of the OSD image itself can be sent to users.

The above operations can be implemented by the address calculation processes. The address calculation process A 802*a* calculates the address of the OSD data to-be-transferred from the 8 bit/pixel OSD information stored in the external storage unit 101. The address calculation process B 802*b* calculates the address of the OSD data to-be-transferred from the 4 bit/pixel OSD information stored in the external storage unit 101. These address calculation processes are simple and can be implemented with ease.

Thus, in accordance with the third embodiment, the OSD processing 701*a* and 701*b* are provided, wherein if all of the main picture output process, the sub-picture output process, and the OSD output process cannot be carried out in real time, like the first embodiment, the real-time output process is guaranteed as a whole. In addition, there is no increase in the program size and complexity in device construction, and no need for high-frequency operation. Moreover, the video output processes are reduced to avoid the state in which no OSD data is displayed. Therefore, users do not feel displeased with video.

While in the third embodiment, 360-byte OSD data is transferred at a time, the amount of data to-be-transferred at a time is not limited to this, and the effects can be provided if another amount is used.

In addition, in the third embodiment, the 8 bit/pixel OSD image is changed into the 4 bit/pixel OSD image to reduce processing load. Alternatively, 8 bit/pixel may be changed into 2 bit/pixel (the amount of data to-be-transferred is reduced to ¼) to further reduce processing load, or 8 bit/pixel may be changed into 6 bit/pixel (the amount of data to-be-transferred is reduced to ¾) to suppress reduction of information relating to color number of the OSD image to-be-displayed while relatively high processing load is placed on the apparatus compared to the two former case. The number of bits making up one pixel in the OSD image may be changed differentially.

Embodiment 4

A description will be given of a video output apparatus according to a fourth embodiment of the present invention with reference to figures. The construction of the video output apparatus of the fourth embodiment is almost identical to that of the first embodiment (see FIGS. 1 and 2). The feature of the video output apparatus of the fourth embodiment is construction of the external storage unit 101. Also, in the sub-picture output process of the fourth embodiment, color/contrast changing process is skipped to reduce the sub-picture output process performed by the central processing control unit, thereby realizing the real-time video output process.

Figure 11:
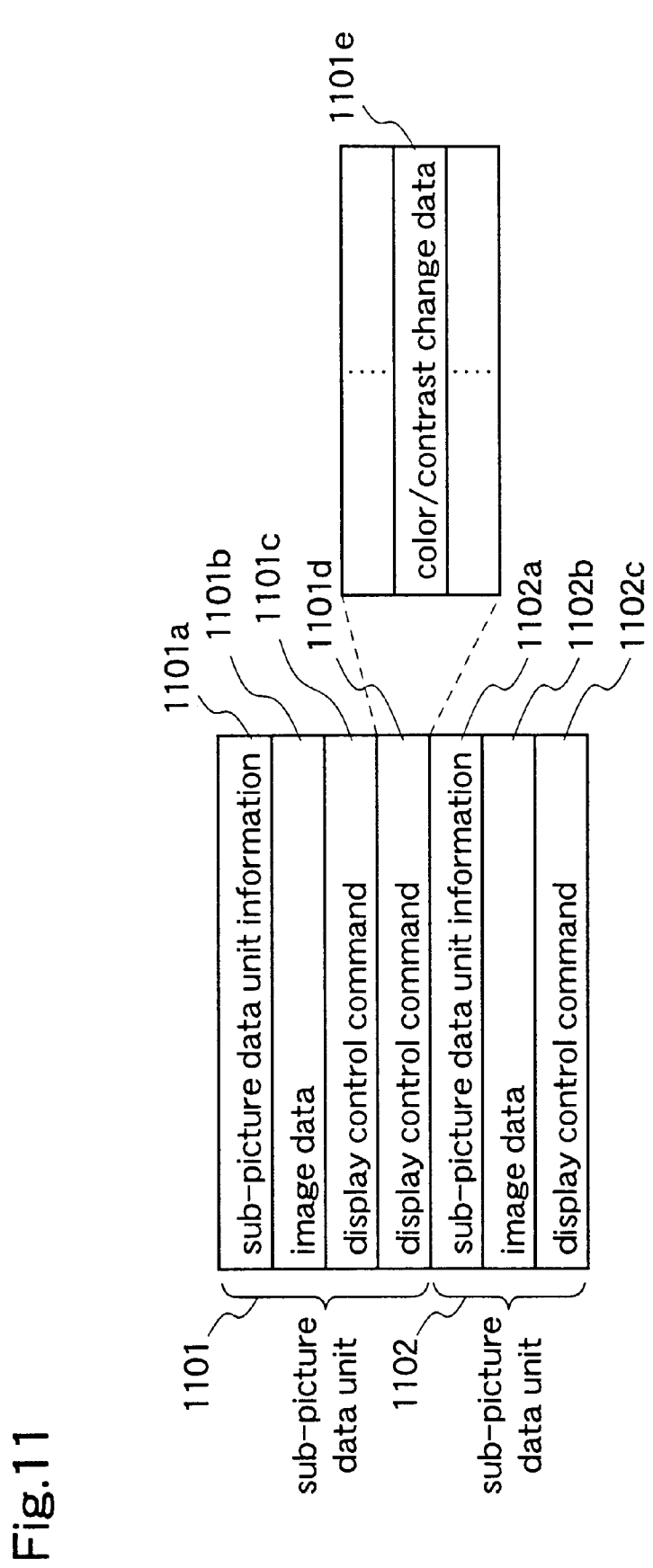
FIG. 11 is a diagram showing structures of sub-picture data units used in a video output apparatus according to a fourth embodiment of the present invention.

FIG. 11 shows an example of sub-picture data units stored in the external storage unit 101. The external storage unit 101 contains sub-picture data units 1101 and 1102.

The sub-picture data unit 1101 is composed of unit information (SPUH) 1101*a*, image data (PXD) 1101*b*, and display control commands (SP_DCSQ) 1101*c* and 1101*d*.

The display control command 1101*d* includes color/contrast change data (CHG_COLON) 1101*e*.

The sub-picture data unit 1102 is composed of unit information 1102*a*, image data 1102*b*, and a display control command 1102*c*.

The unit information 1101a contains a data size (SPU_SZ) of the sub-picture data unit 1101 and a starting address (SPU_DCSQT_SA) of the display control command 1101c. The unit information 1102a contains a data size (SPU_SZ) of the sub-picture data unit 1102 and a starting address (SPU_DCSQT_SA) of the display control command 1102c. The image data 1101b and 1102b each contains image data.

The display control commands 1101c, 1101d, and 1102c contain information about execution time (SP_DSCQ_STM) of the display control command, a starting address (SP_NXT_DCSQ_SA) of a subsequent control command, start of display (FSTA_DSP, STA_DSP), end of display (STP_DSP), initialization color (SET_COLOR), initialization contrast (SET_CONTR), a display position (SET_DAREA), color/contrast change (CHG_COLCON), and so forth.

Figure 12:
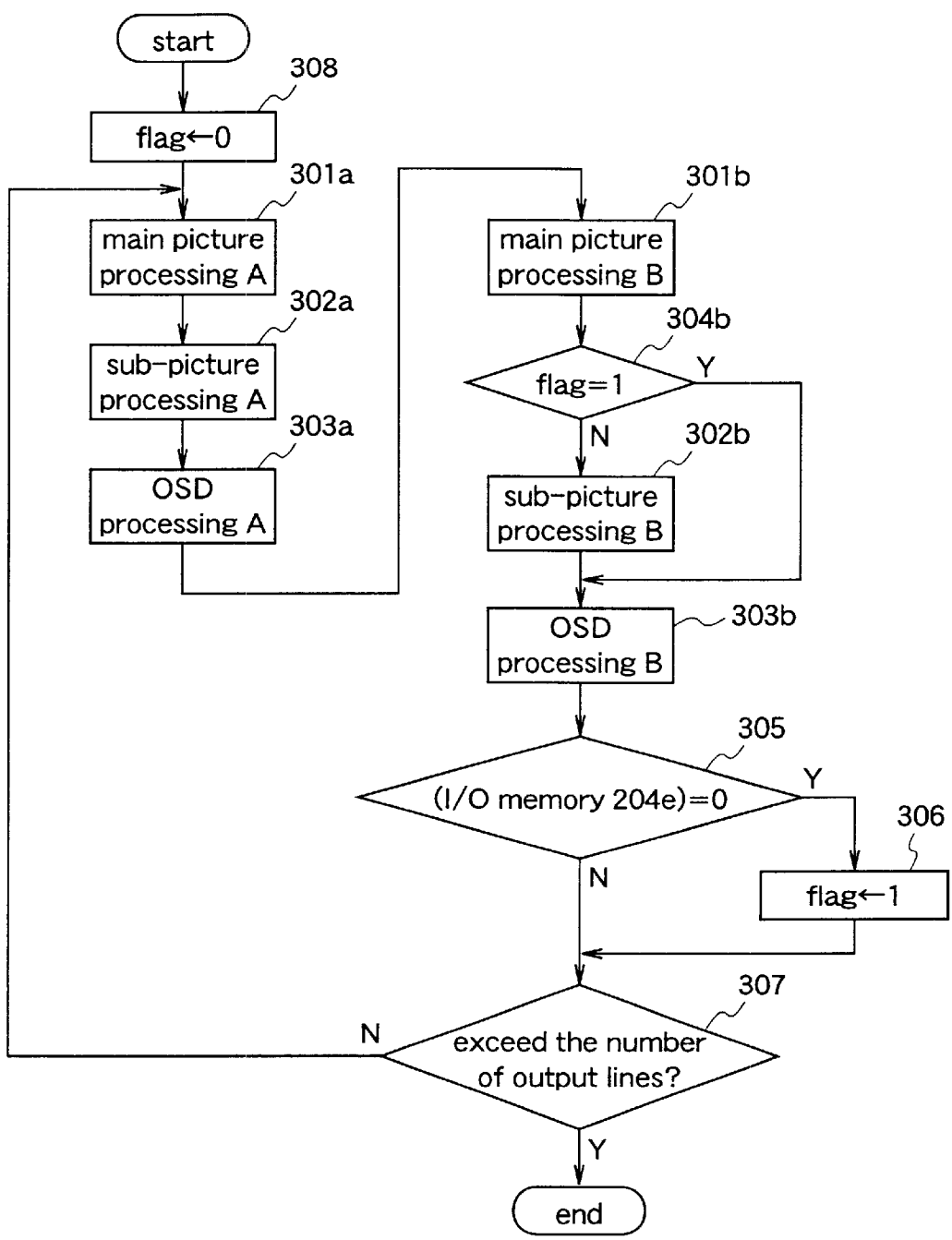
FIG. 12 is a flow chart showing processing performed by the video output apparatus of the fourth embodiment.

Subsequently, a description is given of the video output process performed by the central processing control unit of the fourth embodiment. Turning to FIG. 12, main video processing A 301a and B 301b, OSD processing A 303a and B 303b, decision processes 304b, 305, and 307, and the assignment processes 306 and 308 are almost identical to those shown in FIG. 3. In the video output process shown in FIG. 12, the decision process 304a shown in FIG. 3 is not provided, sub-picture processing A 302a comprises control for data transfer from the external storage unit 101 to the internal storage unit 102, and analysis the sub-picture data unit and the display control command, and sub-picture processing B 302b comprises analysis of the color/contrast change data.

In the sub-picture processing a 302a, the sub-picture data is transferred from the external storage unit 101 to the internal storage unit 102, and then to sub-picture output unit 104b. The sub-picture data unit information 1101a is analyzed to obtain the starting address of the display control command 1101c and the starting address of the subsequent sub-picture data unit 1102. Further, the display control commands 1101c and 1101d are sequentially analyzed according to their execution time. In the sub-picture processing B 302b, the color/contrast change data 1101e is analyzed and the sub-picture output unit 104b is controlled by the control signal 107b. In the decision process 305, when decided that one line processing is not completed, the central processing control unit 106 skips(bypasses) the sub-picture processing B 302b according to the decision result of the decision process 304b, so as not to perform the color/contrast changing process, thereby reducing the sub-picture processing.

Thus, in accordance with the fourth embodiment, when all of the main picture output process, sub-picture output process, and the OSD output process cannot be carried out in real time, only the color/contrast changing process is not performed. Thereby, the whole video output process can be reduced with no need for stopping the sub-picture output. Like the first embodiment, if all of the main picture output process, the sub-picture output process, and the OSD output process cannot be performed in real time, the real-time output process is guaranteed as a whole, and there is no increase in the program size and complexity in device construction, and no need for high-frequency operation. Besides, since the sub-picture processing A 302a is not skipped, control for data transfer from the external storage unit 101 to the internal storage unit 102, analysis of the sub-picture data unit, and analysis of the display control command are carried out for each line. If the video output process is completed within one line, then the sub-picture of the subsequent display command will be output in a normal state. In other words, the main picture output, the sub-picture output, and the OSD output are displayed correctly for each display control command.

Embodiment 5

Figure 13:
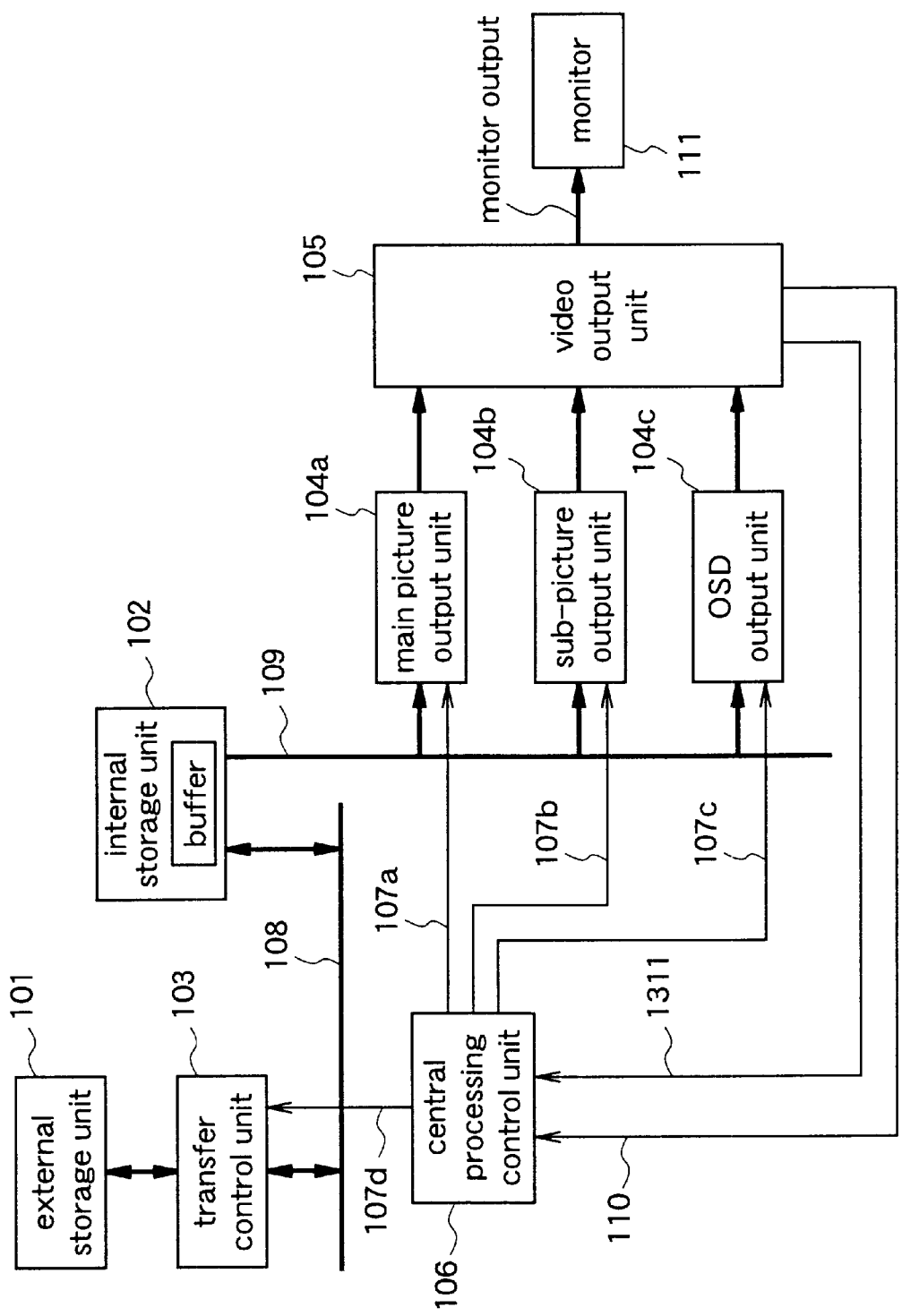
FIG. 13 is a diagram showing a video output apparatus according to a fifth embodiment of present invention.
Figure 14:
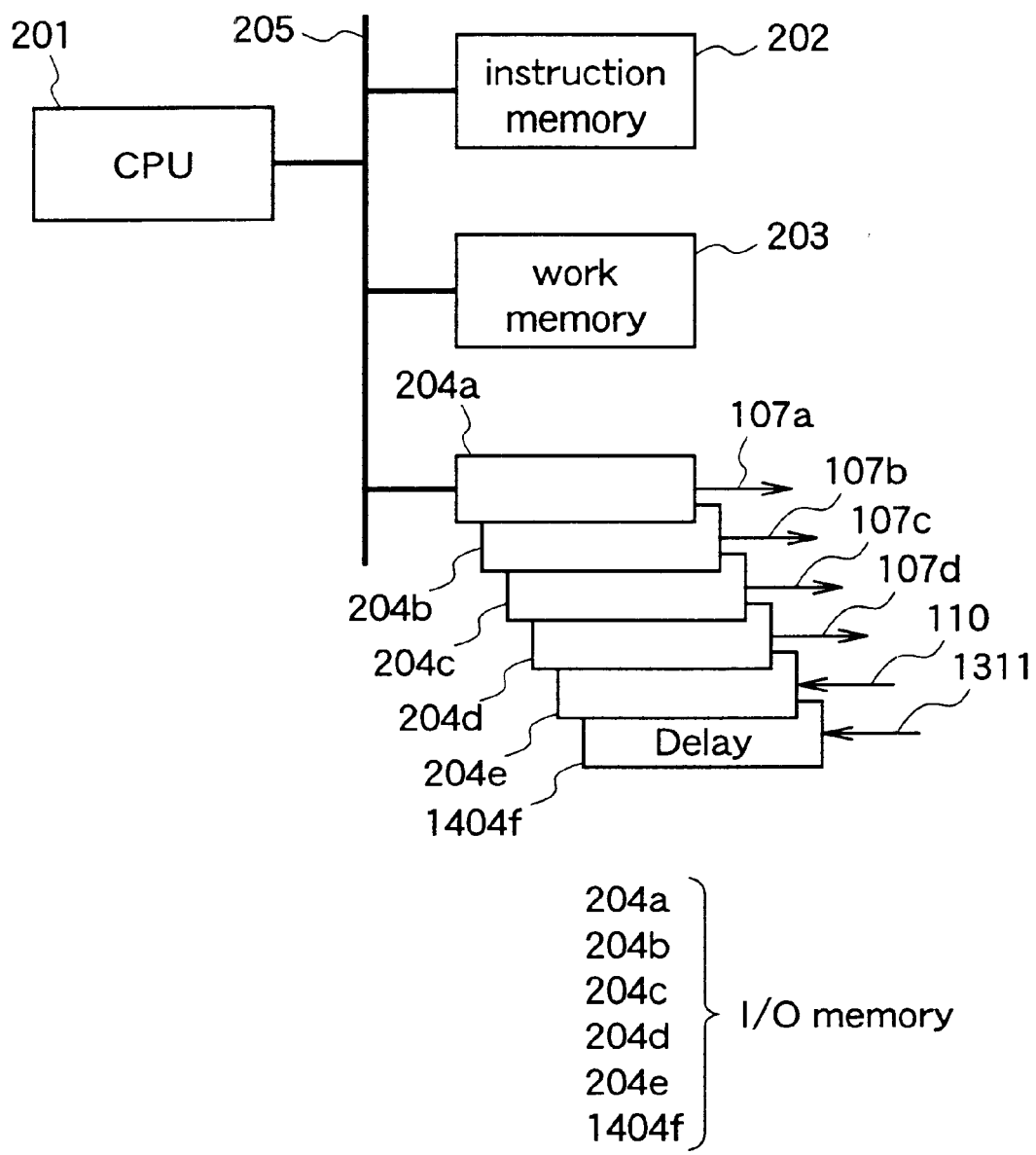
FIG. 14 is a diagram showing a central processing control unit included in the video output apparatus of the fifth embodiment.

A description will be given of a video output apparatus according to a fifth embodiment of the present invention with reference to figures. In this fifth embodiment, when all of the video output processes cannot be carried out in real time, the upper limit of the color/contrast changing process is determined for the sub-picture processing according to increased processing amount, to reduce the sub-picture output process performed by the central processing control unit, thereby realizing the real-time video output process. FIG. 11 shows an example of sub-picture data units for use in the processing of the fifth embodiment, which is identical to that of the fourth embodiment. FIG. 13 shows a video output apparatus of the fifth embodiment. In FIG. 13, 1311 designates a control signal indicating the number of cycles (Delay) after one line starts when sampling is performed at 27 MHz, which is output from the video output unit 105 and input to the central processing control unit 106. The remaining construction is identical to that shown in FIG. 1 and will not be discussed herein. FIG. 14 shows a detailed structure of the central processing control unit 106 shown in FIG. 13. The FIG. 14, reference 1404f designates an I/O memory to which the control signal 1311 from the video output unit 105 is input and the remaining construction is identical to that shown in FIG. 2, and will not be discussed herein.

The starting time of one line is detected when the information of the control signal 110 is written onto the I/O memory 204e, and this information is read by the central processing unit (CPU) 201. Assume that the value "0" of the I/ memory 204e indicates that one line is already started. The CPU 201 writes "1" at the starting point of one line, and then when decided that the value of the I/O memory 204e is "0" in the detection process 305, this means that the subsequent display line is started.

At this time, the content of the I/O memory 1404f is read by the CPU 201 to know the number of processing which is not completed within one line. On the other hand, when decided that the value of the I/ memory 204e is "1", this means that the subsequent display line is not started.

Figure 15:
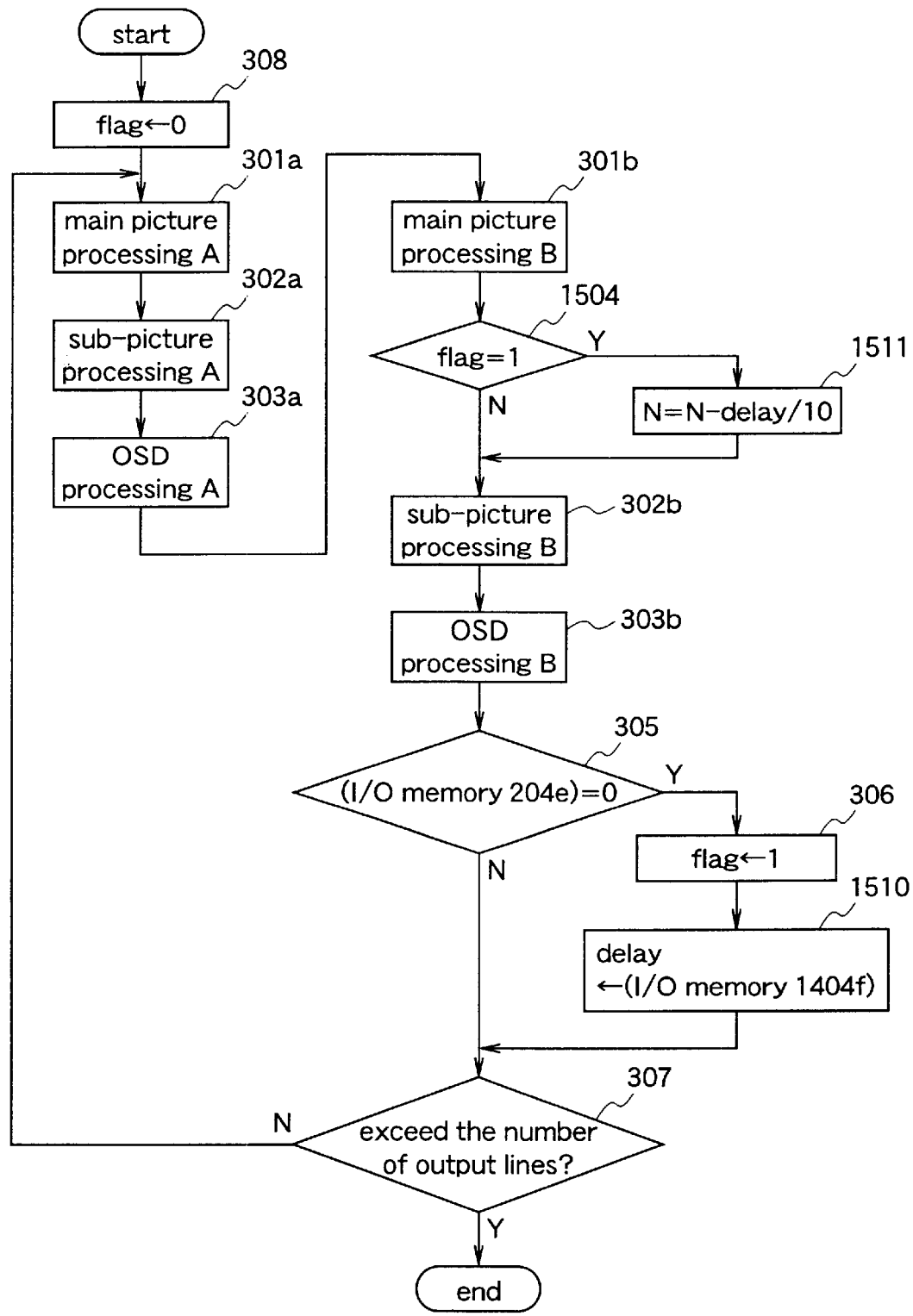
FIG. 15 is a flow chart showing flow of processing performed by the video output apparatus of the fifth embodiment.

Hereinafter, a description will be given of the video output process performed by the central processing control unit 106 with reference to FIG. 15. In the video output process shown in FIG. 15, the processes 304a and 304b shown in FIG. 3 are omitted and instead, processes 1504, 1510, and 1511 are provided. Also, in the sub-picture processing A 302a, data transfer from the external storage unit 101 to the internal storage unit 102 is controlled and the sub-picture data unit and the display control command are analyzed, and in the sub-picture processing B 302b, the color/contrast change data is analyzed.

In the sub-picture processing A 302a, the sub-picture data is transferred from the external storage unit 101 to the internal storage unit 102, and then to sub-picture output unit 104b. The sub-picture data unit information 1101a is analyzed to obtain the starting address of the display control command 1101c and the starting address of the subsequent sub-picture data unit 1102. Further, the display control commands 1101c and 1101d are sequentially analyzed according to their execution time.

In the sub-picture processing B 302b, the color/contrast change data 1101e is analyzed and the sub-picture output unit 104b is controlled by a control signal 107b. In the decision process 1504, it is decided whether processing is delayed. When decided in the process 1504 that processing is delayed, in a process 1511, the number of times of the color/contrast changing process is reduced depending upon delay in the processing. Here, assume that the number of total changing points of color/contrast change is "N" and one change requires 10 cycles. (Delay÷10) is the value converted from delayed processing in one line output process to the number of color/contrast changing points. Unless the output process is reduced by (processing corresponding to the (Delay÷10)), the real-time video output process is not guaranteed. Therefore, in the sub-picture processing, the number of color/contrast changing points is reduced to (N-Delay÷10), whereby the video output process is completed within one line. In (N-Delay÷10), the result is rounded down to a positive integer.

When (N-Delay÷10)≦0, in the sub-picture processing B 302b, the color/contrast changing process is not performed. In the process 1510, "delay" used in the process 1511 is read from the I/O memory 1404f.

Thus, in accordance with the fifth embodiment, when all of the main picture output process, the sub-picture output process, and the OSD output process cannot be carried out in real time, according to the processing amount beyond the scope of one line period, the number of the color/contrast changing points is reduced. Therefore, the sub-picture is output and the entire output process is reduced without skipping all of the color/contrast changing processes. Simultaneously, the real-time video output process is guaranteed. Since the sub-picture processing A 302a is not skipped, control for data transfer from the external storage unit 101 to the internal storage unit 102, analysis of the sub-picture data unit, and analysis of the display control command are carried out for each line. If the video output process is completed within one line, then the sub-picture of the subsequent display command will be output in a normal state. In other words, the main picture output, the sub-picture output, and the OSD output are displayed correctly for each display control command.

Embodiment 6

A description will be given of a video output apparatus according to a sixth embodiment of the present invention with reference to the figures. FIG. 13 shows the video output apparatus for use by the sixth embodiment. In this sixth embodiment, when the video output process cannot be performed in real time, in the sub-picture processing, the process for analyzing the display control command and the color/contrast changing process are not performed, whereby the video output process performed by the central processing control unit can be reduced, and thereby the video output process can be carried out in real time. The construction of the video output apparatus is basically identical to that of the first embodiment.

Figure 16:
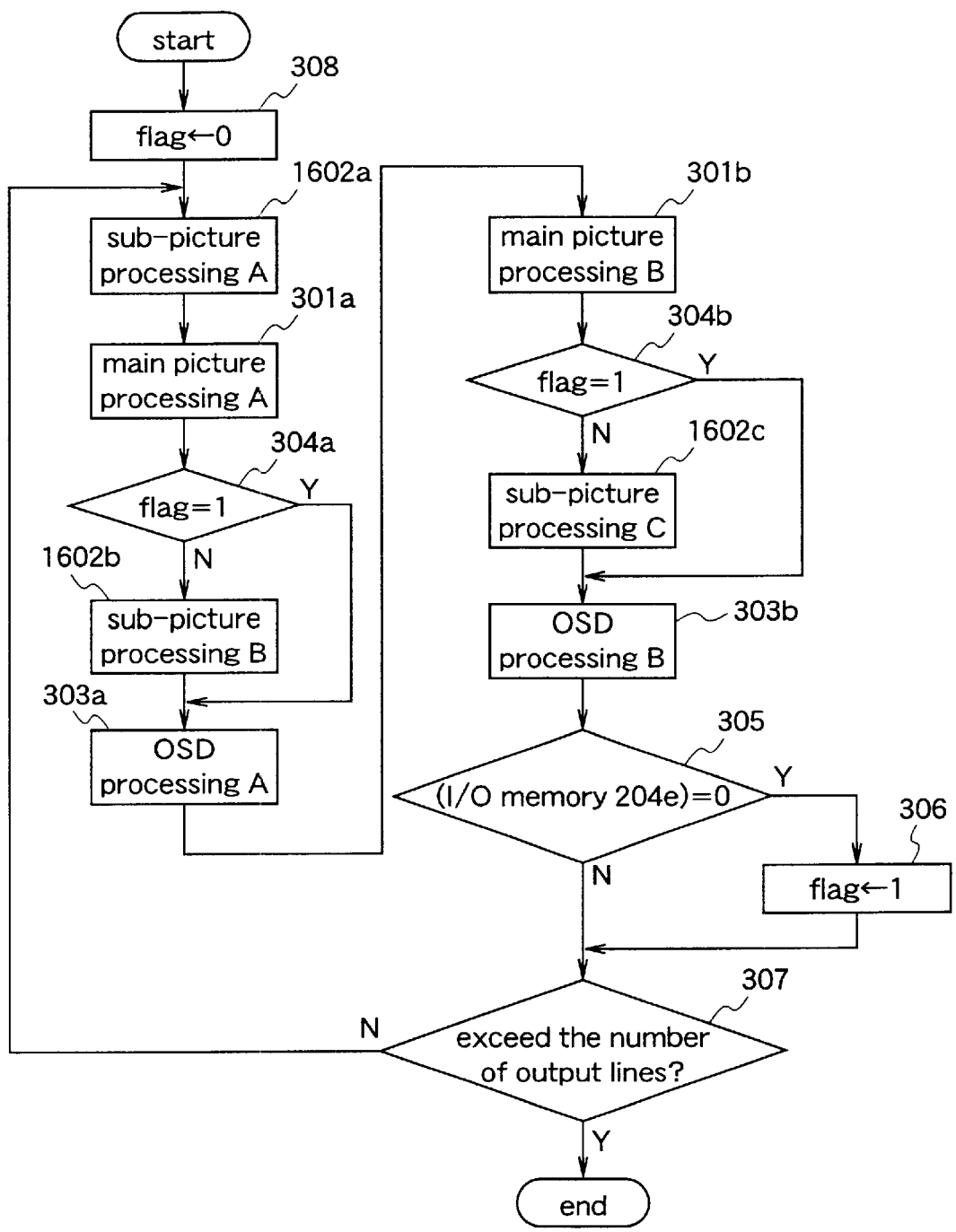
FIG. 16 is a flow chart showing processing performed by a video output apparatus of a sixth embodiment of the present invention.

FIG. 16 shows a video output process performed by the central processing control unit 106 according to the sixth embodiment. In FIG. 16, main picture processing A 301a and B 301b, OSD processing A 303a and B 303b, decision processes 304a, 304b, 305, and 307, and assignment processes 306 and 308 are identical to those shown in FIG. 3. The difference is that sub-picture processing A 1602a, B 1602b, and C 1602c are provided in this embodiment. In the sub-picture processing A 1602a, data transfer from the external storage unit 101 to the internal storage unit 102 is controlled, and the sub-picture data unit is analyzed. In the sub-picture processing B 1602b, the display control command is analyzed. In the sub-picture processing C 1602c, the color/contrast change data is analyzed.

In the sub-picture processing A 1602a, the sub-picture data is transferred from the external storage unit 101 to the internal storage unit 102, and then to sub-picture output unit 104b. The sub-picture data unit information 1101a is analyzed to obtain the starting address of the display control command 1101c and the starting address of the subsequent sub-picture data unit 1102. In the sub-picture processing B 1602b, the display control commands 1101c and 1101d are sequentially analyzed according to their execution time. In the sub-picture processing C 1602c, the color/contrast change data 1101e is analyzed and the sub-picture output unit 104b is controlled by the control signal 107b.

In the decision process 305, when decided that one line processing is not complete, the central processing control unit 106 skips the sub-picture processing B 1602b and C 1602c according to the decision results of the decision processes 304a and 304b. In this manner, the process for analyzing the display control command and the color/contrast changing process are not performed to reduce the sub-picture processing.

Thus, in accordance with the sixth embodiment, when all of the main picture output process, sub-picture output process, and the OSD output process cannot be carried out in real time, the process for analyzing the display command and the color/contrast changing process are not performed. Thereby, if one line processing is not completed, according to the display control command, the whole video output process can be reduced with the sub-picture output, and thereby the real-time video output process is guaranteed.

Since the sub-picture processing A 1602a is not skipped, control for data transfer from the external storage unit 101 to the internal storage unit 102 and analysis of the sub-picture data unit are carried out for each line. If the video output process is completed within one line, then the sub-picture of the subsequent display command will output in a normal state. In other words, the main picture output, the sub-picture output, and the OSD output are displayed correctly for each sub-picture data unit.

Embodiment 7

Figure 17:
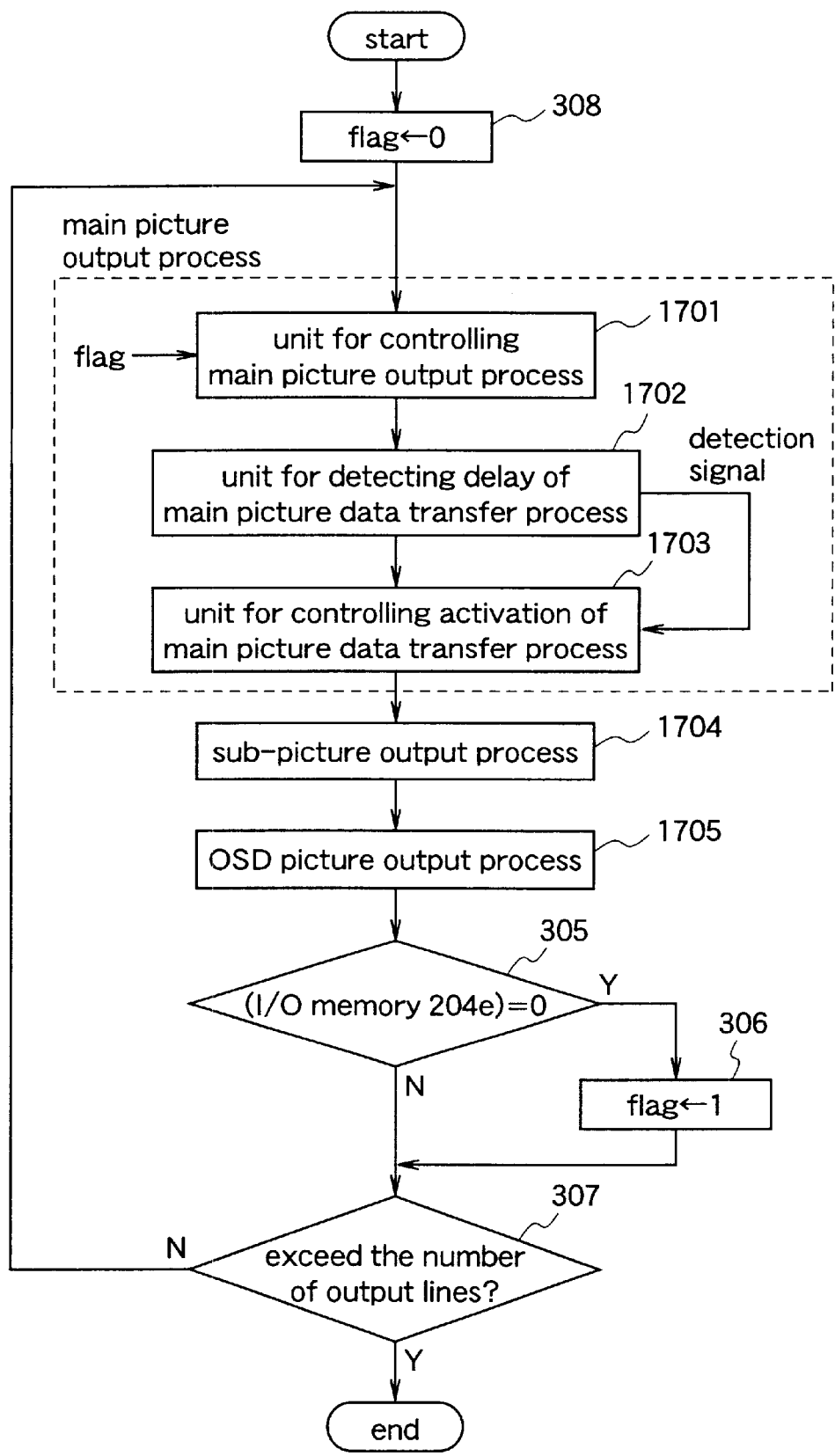
FIG. 17 is a flow chart showing processing performed by a video output apparatus according to a seventh embodiment of the present invention.

A description will be given of a video output apparatus according to a seventh embodiment of the present invention with reference to figures. FIG. 17 shows flow of a main picture output process performed by the video output apparatus of the seventh embodiment. Turning to FIG. 17, for the main picture output process, there are provided a unit (control unit) 1701 for controlling a main picture output process, a unit (detecting unit) 1702 for detecting delay in the main picture data transfer process, and a unit (control unit) 1703 for controlling activation of the main picture data transfer process. The construction of the video output apparatus is identical to that shown in FIG. 1.

Subsequently, a description will be given of operation of the video output process as constructed in accordance with the seventh embodiment.

The unit 1701 sets control information in the transfer control unit 103, the control information being required for transferring main picture data from the external storage unit 101 to the internal storage unit 102. At this time, according to a "flag" indicating that processing is delayed, the output process for lines to-be-displayed is selected.

When flag=1, it is decided that one line processing was not completed when it was output to the monitor 111, and therefore means for reducing the main picture processing is selected. For instance, vertical filtering process may be employed to adjust amount of data to be stored in the internal storage unit 102 during one line period. In this embodiment, a filtering process which reduces the amount of data to-be-stored is selected to reduce processing time for the main picture output process.

When one line processing has exceeded the apparatus performance, the main picture output process on the following line is thus reduced. Furthermore, this embodiment provides means for detecting the state in which the main picture output process itself is not completed within one line period.

For instance, when waiting time occurs before data transfer process is activated, this delay sometimes affects the following sub-picture processing and OSD processing. Hence, for detecting the waiting time, the detecting unit 1702 is provided. In this embodiment, the main picture output process is reduced in order that this delay will not affect the following processes.

When the waiting time has been detected, the control unit 1703 changes the processing in such a manner that data transfer on the corresponding line is not performed. In this case, for main picture display of the corresponding line period, used is video data on a previous (most recent) line which is already stored in a buffer. This is performed based on the fact that a video signal has high correlation in the vertical direction. Such processing can suppress degradation of visual image quality of main picture.

Thus, in accordance with the seventh embodiment, when the waiting time occurs before the data transfer process is activated, this is detected and the main picture processing on the corresponding line is not performed, and the video data on the previous line stored in the buffer is used for display. Thereby, the sub-picture output process, and the OSD output process are carried out while reducing time required for the main picture output process and suppressing accumulation of delay. Simultaneously, degradation of image quality can be suppressed.

According to the processing amount, either the processing by the control unit 1701 or the processing by the detecting unit 1702 and by the control unit 1703 may be used.

Further, the above embodiments may be used in combination. For instance, among the third embodiment which reduces the OSD output process, one of the fourth to sixth embodiments which reduces the sub-picture output process, and the seventh embodiment which reduces the main picture output process, two or more embodiments may be combined. This can be performed flexibly according to the existence/non-existence of coded data of the main picture or the sub-picture, or the existence/non-existence of the OSD display. To be specific, processing which is not being conducted is allocated for combinations of reduction in the main picture output process, the sub-picture output process, and the OSD output process, for each video. This reduces processing which cannot be performed in respective video output processes. As a result, complete video can be displayed as a whole, although each video is incomplete.

Moreover, while in the above embodiments, the main picture data, the sub-picture data, and the OSD data alternately appear, the same video data may appear continuously, or two of these data may alternately appear.

What is claimed is:

1. A video output apparatus comprising:

video data processing means for processing plural pieces of video data of different types and outputting the resulting video data to a monitor;

video processing delay detecting means for detecting delay by deciding whether or not processing for the plural pieces of video data performed by the video data processing means is completed in real time when it is output to the monitor; and video data processing control means for controlling the video data processing means so that the processing performed by the video data processing means which is to be allocated for one line period is reduced when the video processing delay detecting means detects delay.

2. The video output apparatus of claim 1 wherein the video data processing control means controls the video data processing means by setting a priority of the video data processing when the processing is reduced.

3. The video output apparatus of claim 2 wherein the priority is determined according to distance from a user's view point to a display image on the monitor.

4. The video output apparatus of claim 2 wherein the priority is determined according to display information set in the video data.

5. The video output apparatus of claim 1 wherein at least one of the processing for the plural pieces of video data to be performed during one line period is divided into plural processes.

6. The video output apparatus of claim 1 wherein the video processing delay detecting means detects delay in units, each unit comprising either a predetermined number of fields or a predetermined number of frames.

7. The video output apparatus of claim 1 wherein the video processing delay detecting means detects delay in units, each unit comprising a predetermined number of lines.

8. The video output apparatus of claim 1 wherein the video data processing control means skips at least one part of video data processing among the processing for the plural pieces of video data, to reduce the processing.

9. The video output apparatus of claim 5 wherein the video data processing control means skips at least one part of video data processing among the processing for the plural pieces of video data, to reduce the processing.

* * * * *